D'ORSAY McC. WHITE.
HYDROCARBON MOTOR.
APPLICATION FILED NOV. 24, 1916.
1,276,846.
Patented Aug. 27, 1918.
2 SHEETS—SHEET 2.
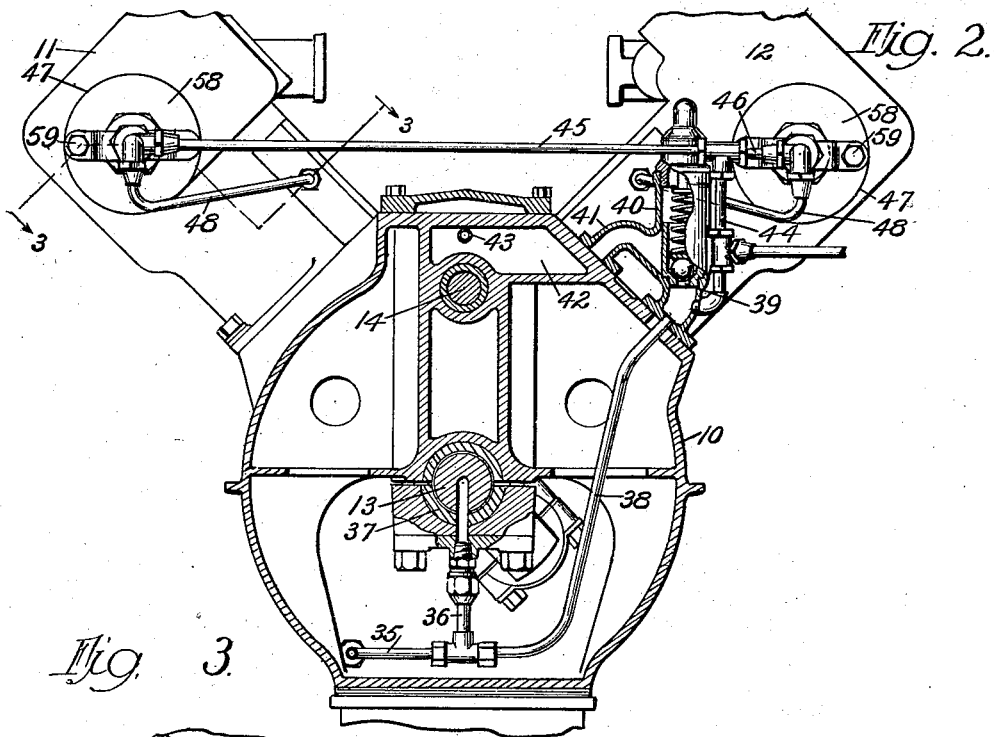
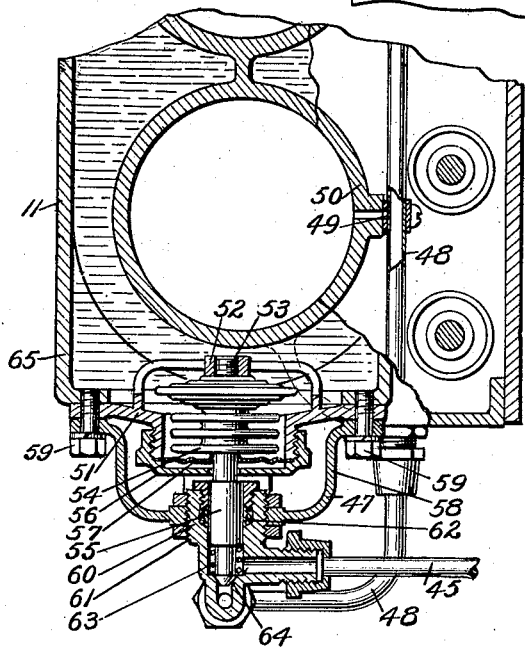
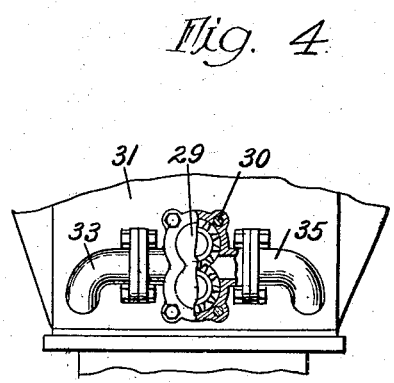
Inventor
D. McCALL WHITE
By
Attorney

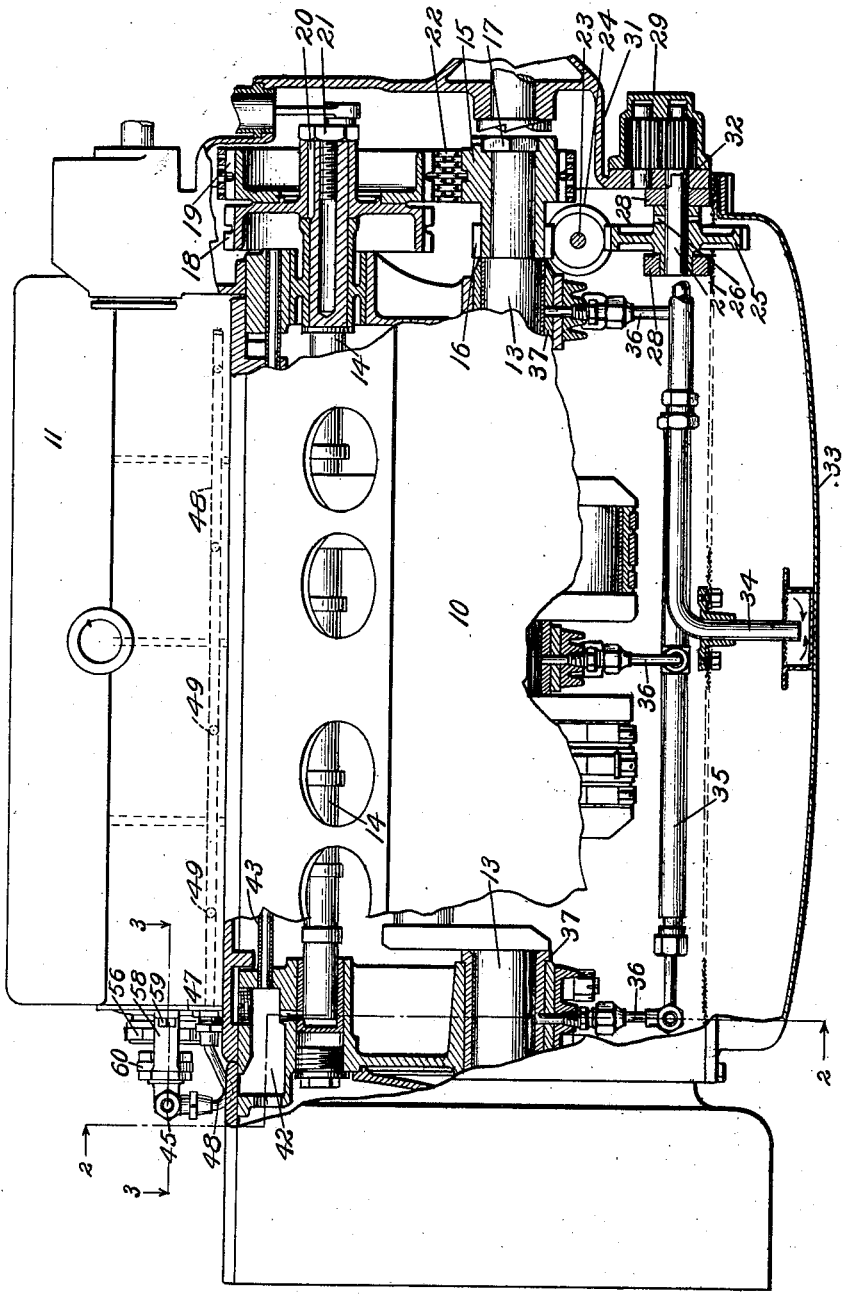

UNITED STATES PATENT OFFICE.

D'ORSAY McCALL WHITE, OF DETROIT, MICHIGAN, ASSIGNOR TO CADILLAC MOTOR CAR COMPANY, OF DETROIT, MICHIGAN, A CORPORATION OF MICHIGAN.

HYDROCARBON-MOTOR.

1,276,846.   Specification of Letters Patent.   Patented Aug. 27, 1918.

Application filed November 24, 1916. Serial No. 133,187.

*To all whom it may concern:*

Be it known that I, D'ORSAY McCALL WHITE, a loyal subject of the King of England, and resident of Detroit, Wayne county, State of Michigan, have invented certain new and useful Improvements in Hydrocarbon-Motors, of which the following is a specification.

This application relates to hydrocarbon motors and particularly to lubricating systems therefor.

When hydrocarbon motor vehicle power plants are operated in cold weather it is customary to enrich the fuel mixture just prior to shutting the motor off to facilitate starting. When this is done the gases confined within the cylinder are caused to condense as the cylinder walls cool. The condensation will then flow between the cylinder walls and the pistons, washing any remaining lubricant from these parts; and frequently it is found difficult, if not impossible, to turn over or start the motor on account of the "freezing" or rusting together of a piston and cylinder wall. In the event that the motor may be turned over under these conditions scoring of the cylinder wall is likely to result for the reason that the necessary film of lubricant between the piston and the cylinder wall has been eliminated.

To overcome these and other difficulties, this invention provides means for automatically controlling or regulating, as by thermo-sensitive devices, the circulation of lubricant to parts of the motor, especially to the cylinder walls.

Another object of this invention is to provide means for automatically feeding lubricant directly to the motor cylinder walls when the temperature thereof is below a predetermined minimum, and to cut off the flow of lubricant when the temperature exceeds a predetermined limit.

These and other objects will appear from the following description, taken in connection with the accompanying drawings, which form a part of this specification, and in which:—

Figure 1 is a side elevation with portions broken away and others in section, of a hydrocarbon power plant embodying this invention;

Fig. 2 is a transverse vertical section along substantially line 2—2 of Fig. 1;

Fig. 3 is a fragmentary longitudinal, horizontal section substantially on the line 3—3 of Figs. 1 and 2;

Fig. 4 is a front elevation, with portions broken away of the lubricant pump illustrated in section in Fig. 1.

Referring to the drawings which are illustrative only, 10 is a crank case on which may be suitably arranged, in V relation, a pair of cylinder blocks 11 and 12. A crank shaft 13 and a cam shaft 14 are adapted to be mounted in the usual manner in bearings in the crank case. A spur gear 15, and a spiral gear 16, may be arranged on and secured to the front end of the crank shaft 13, as by a bolt 17. A pair of spur gears 18 and 19, respectively, may be secured as by a key 20, and bolt 21, to the front end of the cam shaft 14. The gear 19, is adapted to be driven from the crankshaft gear 15, as by a chain 22.

A transverse shaft 23, may be suitably mounted in the crankcase 10, with a spiral gear 24, fixed thereto and adapted to be driven from the crank shaft spiral gear 16, and to drive another spiral gear 25, secured as by a pin 26, to a shaft 27, arranged in suitable crank case bearings 28. A lubricant pump 29, of the well known gear type, may be suitably secured as by bolts 30, to the cover 31, at the front end of the crank case. This pump is adapted to have a pin and slot driving connection 32, with the shaft 27.

The pump is adapted to draw its supply of lubricant from the reservoir or sump 33, through the intake conduit 34, forcing it through the main line 35, and risers 36, to the crank shaft main bearings 37. Another riser 38, connects the main line 35, with an inlet port 39, of an overflow or relief valve 40, which may be of any well known type, but which is illustrated as of the ball and spring type. When the pressure within the lubricating system exceeds the pressure for which the valve 40 is adjusted, lubricant is discharged through the outlet port 41, to a chamber 42, from which it may be distributed through the conduit 43, to various other parts of the motor. Suitably connected in the lubricating system between the line 38, and the inlet port 39, of the valve mechanism 40, is a conduit 44, provided with a pair of branches 45 and 46.

Each of the branches 45 and 46, respectively, is adapted to feed lubricant through regulating devices 47, to a conduit 48, having ports 49, in direct communication with the interior 50, of the cylinder walls. The regulating device 47, comprises a shell or cage 51, having a boss 52, in which may be secured as by threads 53, a corrugated, collapsible, thermostat tube 54. The tube 54, is adapted to be filled with a thermo-sensitive liquid, such as mercury or alcohol, so that with a rise in temperature the tube will expand and with the lowering of the temperature the tube will contract. A valve stem 55, may be suitably secured, such as by brazing or welding, to the lower end of the tube 54. The outer end of the cage 51, may be sealed by a threaded cover member 56, and a flexible disk 57. The entire unit, together with a cup 58, may be secured as by bolts 59, to the rear end of a cylinder block. A valve chamber 60, has its threaded portion 61, arranged in the cup 58. The valve member 55, is suitably arranged in the chamber 60, having a packing joint 62. A spring 63, may be inserted between the lower end of the valve member 55, and its seat 64. It will be noted that the thermo-element 54, will at all times be subject to the temperature of the circulating medium in the cylinder jacket 65.

The operation and functioning of this invention will be understood from the foregoing description, as follows:

Assuming the motor to be started, lubricant will be fed by the pump 29, to the crank shaft main bearings, 37, and through the conduits 38 and 44, to the branches 45 and 46; if the temperature of the cylinder walls 50, and also the circulating medium within the jacket 65, is below the desired minimum, the thermo-element 54, will be contracted with the valve member 55, from its seat 64, thereby permitting lubricant to be forced from a branch 45 or 46, through a conduit 48, and port 49, to a cylinder wall 50. Of course, as the temperature rises above the desired limit, the thermo-element 54, will be expanded, returning the valve member 55, to its seat and closing off the direct flow of lubricant to the cylinder wall 50.

It will be noted that my invention provides simple, efficient and satisfactory means for automatically feeding lubricant to the cylinder walls or any other desired part of the motor, when the temperature varies from a pedetermined point, and to cut off the flow of lubricant when the temperature exceeds a predetermined limit.

While I have described and will specifically claim what I deem to be a preferred embodiment of my invention, it will, of course, be understood by those skilled in the art, that various modifications and changes may be made without departing from the spirit and scope hereof.

Having thus described my invention, what I claim and desire to secure by Letters Patent is:

1. In a device of the class described, in combination, means for supplying a lubricant to a surface, means for circulating a temperature control medium about said surface, and means actuated by changes in the temperature of said temperature control medium for regulating the supply of the lubricant.

2. In an internal combustion engine, the combination with means for circulating lubricant to various parts thereof, of means directly in contact with parts to be lubricated for regulating the action of said circulating means.

3. In an internal combustion engine, the combination with a cylinder having a temperature control medium thereabout, of means, actuated by changes in the temperature of said control medium for regulating the flow of lubricant thereto.

4. In an internal combustion engine, the combination with means for feeding lubricant to various parts thereof, of thermo-sensitive means for regulating the flow of lubricant to one part independently of the feed to other parts thereof.

5. In an engine, the combination with a crank case, a shaft mounted in bearing therein, and a cylinder, of a lubricating system comprising means for feeding lubricant to said bearings, and thermo-sensitive means for feeding lubricant to said cylinder.

6. In an internal combustion engine, the combination with a crank case and a cylinder mounted thereon, of thermo-sensitive means for feeding lubricant from said crank case to said cylinder.

7. In an internal combustion engine, the combination with a crank case, a shaft mounted in bearings therein, and a cylinder, of means for feeding lubricant to said bearings and the interior of said cylinder, the feed to said cylinder being adapted to be regulated by thermo-sensitive devices.

8. In an internal combustion engine, the combination with a crank case, a crank shaft mounted in bearings therein, and a cylinder mounted thereon, of means for feeding lubricant from said crank case to said bearings and cylinder, respectively, the feed to said cylinder being adapted to be regulated by a thermo-sensitive device.

9. In an internal combustion engine, the combination with a crank case, a shaft mounted in bearings therein, a cylinder and means for pumping oil from said crank case to said bearings and cylinder, respectively, of a thermo regulator between said pumping means and said cylinder for regulating the supply of lubricant thereto.

10. In an internal combustion engine, the combination with a cylinder and a jacket therefor, of means responsive to changes in temperature of said jacket, for feeding lubricant to said cylinder.

In testimony whereof I affix my signature.

D. McCALL WHITE.